US012749296B2

(12) United States Patent
Kim et al.

(10) Patent No.: US 12,749,296 B2
(45) Date of Patent: Sep. 29, 2026

(54) METHOD AND APPARATUS WITH OBJECT RECOGNITION

(71) Applicant: SAMSUNG ELECTRONICS CO., LTD., Suwon-si (KR)

(72) Inventors: Insoo Kim, Seongnam-si (KR); Kikyung Kim, Hwaseong-si (KR); Seungju Han, Seoul (KR); Jiwon Baek, Hwaseong-si (KR); Jaejoon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 817 days.

(21) Appl. No.: 17/970,907

(22) Filed: Oct. 21, 2022

(65) Prior Publication Data

US 2023/0222781 A1 Jul. 13, 2023

(30) Foreign Application Priority Data

Jan. 10, 2022 (KR) ........................ 10-2022-0003434

(51) Int. Cl.
*G06V 10/80* (2022.01)
*G06F 18/213* (2023.01)
(Continued)

(52) U.S. Cl.
CPC ........ *G06V 10/806* (2022.01); *G06V 10/7715* (2022.01); *G06V 10/82* (2022.01)

(58) Field of Classification Search
CPC .. G06V 10/806; G06V 10/7715; G06V 10/82; G06V 10/42; G06V 10/44;
(Continued)

(56) References Cited

U.S. PATENT DOCUMENTS

| | | | |
|---|---|---|---|
| 6,563,950 | B1 | 5/2003 | Wiskott et al. |
| 7,646,909 | B2 | 1/2010 | Jiang et al. |

(Continued)

FOREIGN PATENT DOCUMENTS

| | | | |
|---|---|---|---|
| CN | 110619369 B * | 12/2020 | G06F 18/214 |
| CN | 113011386 A * | 6/2021 | G06N 3/047 |

(Continued)

OTHER PUBLICATIONS

S. Chen and Y. Tian, "Pyramid of Spatial Relatons for Scene-Level Land Use Classification," in IEEE Transactions on Geoscience and Remote Sensing, vol. 53, No. 4, pp. 1947-1957, Apr. 2015, doi: 10.1109/TGRS.2014.2351395. (Year: 215).*

(Continued)

*Primary Examiner* — Stephen R Koziol
*Assistant Examiner* — Joshua Chen
(74) *Attorney, Agent, or Firm* — NSIP Law

(57) ABSTRACT

A method and apparatus for object recognition are provided. A processor-implemented method includes extracting feature maps including local feature representations from an input image, generating a global feature representation corresponding to the input image by fusing the local feature representations, and performing a recognition task on the input image based on the local feature representations and the global feature representation.

26 Claims, 15 Drawing Sheets

(51) Int. Cl.

| | |
|---|---|
| ***G06N 3/0464*** | (2023.01) |
| ***G06V 10/42*** | (2022.01) |
| ***G06V 10/44*** | (2022.01) |
| ***G06V 10/764*** | (2022.01) |
| ***G06V 10/77*** | (2022.01) |
| ***G06V 10/82*** | (2022.01) |

(58) Field of Classification Search

CPC .... G06V 10/454; G06V 10/54; G06V 10/764; G06V 10/774; G06N 3/0464; G06N 3/045; G06N 3/08; G06F 18/213; G06F 18/253

See application file for complete search history.

(56) References Cited

U.S. PATENT DOCUMENTS

| | | | | |
|---|---|---|---|---|
| 8,121,357 | B2 | 2/2012 | Imaoka | |
| 8,571,332 | B2 | 10/2013 | Kumar et al. | |
| 8,856,541 | B1 | 10/2014 | Chaudhury et al. | |
| 9,171,217 | B2 | 10/2015 | Pawlicki et al. | |
| 9,547,790 | B2 | 1/2017 | Kim et al. | |
| 9,798,871 | B2 | 10/2017 | Suh et al. | |
| 9,928,410 | B2 | 3/2018 | Yoo et al. | |
| 10,083,343 | B2 | 9/2018 | Suh et al. | |
| 10,121,059 | B2 | 11/2018 | Yoo et al. | |
| 10,210,379 | B2 | 2/2019 | Suh et al. | |
| 10,248,845 | B2 | 4/2019 | Han et al. | |
| 10,275,684 | B2 | 4/2019 | Han et al. | |
| 10,331,941 | B2 | 6/2019 | Rhee et al. | |
| 10,878,592 | B2 | 12/2020 | Croxford et al. | |
| 10,891,514 | B2 * | 1/2021 | Liu | G06N 3/08 |
| 10,990,658 | B2 | 4/2021 | Suh et al. | |
| 12,249,138 | B2 * | 3/2025 | Kilickaya | G06V 10/778 |
| 2012/0288167 | A1 | 11/2012 | Sun et al. | |
| 2013/0322705 | A1 | 12/2013 | Wong | |
| 2014/0044359 | A1 | 2/2014 | Rousson | |
| 2014/0169643 | A1 | 6/2014 | Todoroki | |
| 2015/0125049 | A1 | 5/2015 | Taigman et al. | |
| 2016/0070952 | A1 | 3/2016 | Kim et al. | |
| 2021/0056344 | A1 | 2/2021 | Zhang et al. | |

FOREIGN PATENT DOCUMENTS

| | | | |
|---|---|---|---|
| KR | 10-1731461 | B1 | 5/2017 |
| KR | 10-2019-0089777 | A | 7/2019 |
| KR | 10-2020-0007022 | A | 1/2020 |
| KR | 10-2102161 | B1 | 4/2020 |
| KR | 10-2186913 | B1 | 12/2020 |
| KR | 10-2021-0011707 | A | 2/2021 |
| KR | 10-2021-0079922 | A | 6/2021 |
| WO | WO 2021/097378 | A1 | 5/2021 |

OTHER PUBLICATIONS

S. Guo, Li Liu, W. Wang, Songyang Lao and L. Wang, "An attention model based on spatial transformers for scene recognition," 2016 23rd International Conference on Pattern Recognition (ICPR), Cancun, Mexico, 2016, pp. 3757-3762, doi: 10.1109/ICPR.2016.7900219. (Year: 2016).*

Dosovitskiy, Alexey, et al. "An image is worth 16x16 words: Transformers for image recognition at scale." arXiv preprint arXiv: 2010.11929 (2020). (Year: 2020).*

Jetley, Saumya, et al. "Learn to pay attention." arXiv preprint arXiv: 1804.02391 (2018) (Year: 2018).*

Minaee, Shervin, et al. "Image segmentation using deep learning: A survey." IEEE transactions on pattern analysis and machine intelligence 44.7 (2021): 3523-3542. (Year: 2021).*

Jetley, Saumya, et al. "Learn To Pay Attention." arXiv:1804.02391v2, Apr. 26, 2018, (14 pages in English).

Minaee, Shervin, et al. "Image Segmentation Using Deep Learning: A Survey." IEEE transactions on pattern analysis and machine intelligence 44.7, arXiv:2001.05566v5, Nov. 15, 2020: (22 pages in English).

Extended European search report issued on Jun. 14, 2023, in counterpart European Patent Application No. 22210327.7 (12 pages in English).

Kathuria, Ayoosh. "What's new in YOLO v3?" Towards Date Science. (2018). pp 1-15.

Rozsa, Andras, et al. "Are accuracy and robustness correlated." *2016 15th IEEE international conference on machine learning and applications* (*ICMLA*). IEEE, (2016). pp 1-6.

Choi, Jun-Ho, et al. "Evaluating robustness of deep image super-resolution against adversarial attacks." *Proceedings of the IEEE/CVF International Conference on Computer Vision*. (2019). pp 303-311.

European Office Action issued on Jun. 10, 2025, in corresponding European Patent Application No. 22210327.7. (8pages in English).

* cited by examiner

METHOD AND APPARATUS WITH OBJECT RECOGNITION

CROSS-REFERENCE TO RELATED APPLICATIONS

This application claims the benefit under 35 USC § 119(a) of Korean Patent Application No. 10-2022-0003434, filed on Jan. 10, 2022, in the Korean Intellectual Property Office, the entire disclosure of which is incorporated herein by reference for all purposes.

BACKGROUND

1. Field

The following description relates to a method and apparatus with object recognition.

2. Description of Related Art

Technological automation or recognition processes have been performed through the implementation of a neural network aby a processor as a special computing structure, to provide intuitive mapping for computation between an input and an output after considerable training. An ability to be trained to generate such mapping may be referred to as a learning ability of a neural network. Furthermore, a neural network trained and specialized through special training has, for example, a generalization ability to provide a relatively accurate output with respect to an untrained input pattern.

SUMMARY

In one general aspect, a processor-implemented method includes extracting feature maps including local feature representations from an input image, generating a global feature representation corresponding to the input image by fusing the local feature representations, and performing a recognition task on the input image based on the local feature representations and the global feature representation.

The generating of the global feature representation may include fusing pooling results corresponding to the local feature representations.

The pooling may include global average pooling.

The determining of the global feature representation may include performing an attention mechanism using query data pre-trained in association with the recognition task.

The determining of the global feature representation by performing the attention mechanism may include determining key data and value data corresponding to the local feature representations, determining a weighted sum of the value data based on similarity between the key data and the query data, and determining the global feature representation based on the weighted sum.

The performing of the recognition task may include estimating a first recognition result corresponding to the local feature representations, using a first recognition model, and estimating a second recognition result corresponding to the global feature representation, using a second recognition model.

The first recognition model may include an object detection model configured to estimate a detection result from the local feature representations, and the second recognition model may include a classification model configured to estimate a classification result from the global feature representation.

The detection result may include one or more of bounding box information, objectness information, or class information, and the classification result may include one or more of multi-class classification information, context classification information, or object count information.

The method may further include training the first model and training the second model, wherein the training the first recognition model may affect the training of the second recognition model, and the training of the second recognition model may affect the training of the first recognition model.

The training of the first model and the training of the second model may include using an in-training feature extraction model, or a trained feature extraction model, to extract training feature maps including in-training local feature representations from a training input image, using an in-training feature fusion model, or a trained fusion model, to determine a training global feature representation corresponding to the training input image by fusing the training local feature representations, using an in-training first recognition model to estimate a training first recognition result corresponding to the training local feature representations, using an in-training second recognition model to estimate a training second recognition result corresponding to the training global feature representation, and generating the first model and the second model by training the in-training first recognition model and the in-training second recognition model together based on the training first recognition result and the training second recognition result.

The performing of the recognition task may further include determining a task result recognized by the recognition task by fusing the first recognition result and the second recognition result.

The recognition task may correspond to one of plural task candidates, the task candidates having respectively associated pre-trained query data items, and the determining of the global feature representation may further includes selecting, from among the pre-trained query data items, a query data item associated with the recognition task, and determining the global feature representation by performing an attention mechanism based on the selected query data item.

The method may further include capturing the input image using a camera.

In one general aspect, a processor-implemented method includes using a feature extraction model to extract feature maps including local feature representations from an input image, using a feature fusion model to determine a global feature representation corresponding to the input image by fusing the local feature representations, using a first recognition model to estimate a first recognition result corresponding to the local feature representations, using a second recognition model to estimate a second recognition result corresponding to the global feature representation, and based on the first recognition result and the second recognition result, training one or more of the feature extraction model, the feature fusion model, the first recognition model, or the second recognition model.

The method may further include determining a training loss based on the first recognition result and the second recognition result, wherein the training is based on the training loss.

The first recognition model and the second recognition model may be trained as an integrated model such that each affect training of the other.

The second recognition model may include a plurality of classification models respectively corresponding to task candidates, the feature fusion model may be configured to determine the global feature representation by performing an attention mechanism based on query data corresponding to a current task candidate among the task candidates, and the determining of the training loss may include determining the training loss by applying a classification result of a classification model corresponding to the current task candidate among the task candidates as the second recognition result.

Training the first recognition model may affect training the second recognition model and training the second recognition model may affect training the first recognition model.

In one general aspect, an electronic apparatus includes a processor configured to extract feature maps including respective local feature representations from an input image, determine a global feature representation corresponding to the input image by fusing the local feature representations, and perform a recognition task on the input image based on the local feature representations and the global feature representation.

The electronic apparatus may further include a camera configured to generate the input image.

The processor may be further configured to determine the global feature representation by fusing pooling results corresponding to the local feature representations.

The processor may be further configured to determine the global feature representation by performing an attention mechanism using query data pre-trained in response to the recognition task.

The attention mechanism may include a vision transformer model that performs the fusing based on similarity of keys and values of the query data.

The processor may be further configured to use a first recognition model to estimate a first recognition result corresponding to the local feature representations, and use a second recognition model to estimate a second recognition result corresponding to the global feature representation.

The processor may be further configured to select between the first recognition model and the second recognition model based on the recognition task.

The first recognition model may include an object detection model configured to estimate a detection result corresponding to each of the local feature representations, and the second recognition model may include a classification model configured to estimate a classification result corresponding to the global feature representation.

The processor may be further configured to determine a task result of the recognition task by fusing the first recognition result and the second recognition result.

In one general aspect, a method includes generating feature maps from an input image, wherein the generating of the feature maps is performed by one or more layers of a neural network, forming a feature pyramid from the feature maps, providing the feature pyramid to a first model that outputs an object recognition prediction based on the feature pyramid, extracting global features of the image from the feature pyramid, and providing the global features to another one or more layers of the neural network to generate a scene recognition prediction based on the global features.

The neural network may include a convolutional neural network.

The extracting global features includes either global average pooling of the feature maps or performing attention-based vision transformation of the feature maps.

The scene recognition prediction includes a scene classification.

The method may further include generating a scene result from the object recognition prediction, and generating a final scene prediction by fusing the scene result with the scene recognition prediction.

The neural network may include one or more additional layers as the first model.

In one general aspect a non-transitory computer-readable storage medium stores instructions that, when executed by a processor, configure the processor to perform any of the methods.

Figure 1:
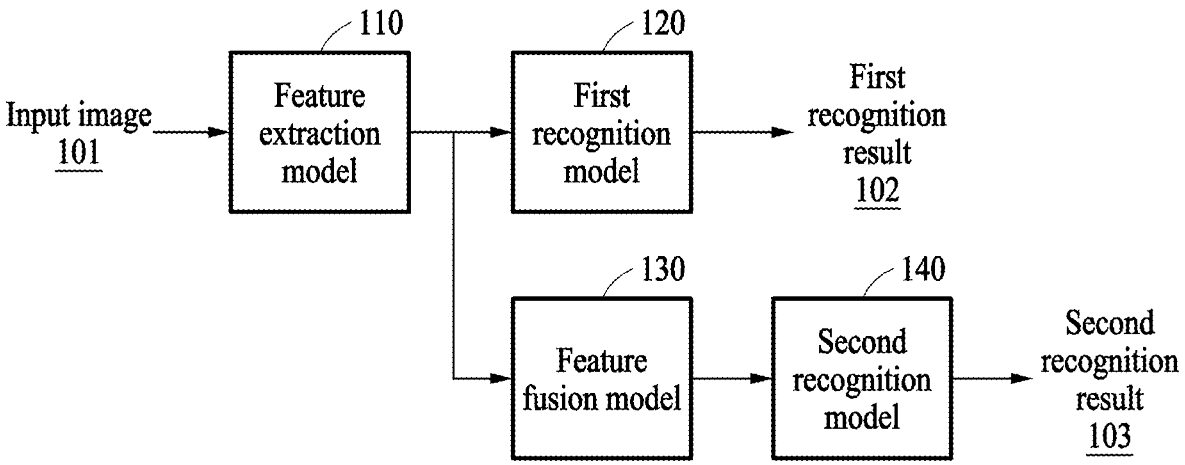
FIG. 1 illustrates an example of an architecture for task-oriented object detection, according to one or more embodiments.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

FIG. 1 illustrates an example of an architecture for task-oriented object detection, according to one or more examples. Referring to FIG. 1, recognition results, for example, a first recognition result 102 and a second recognition result 103, corresponding to an input image 101 may be generated using a feature extraction model 110, a first recognition model 120, a feature fusion model 130, and a second recognition model 140. The feature extraction model 110, the first recognition model 120, the feature fusion model 130, and/or the second recognition model 140 may be implemented as machine learning models, e.g., as neural network models, any of which may be, for example a deep neural network (DNN) including a plurality of layers, for example an input layer, at least one hidden layer, and an output layer.

A DNN may include a fully connected network (FCN) portion, a convolutional neural network (CNN) portion, and/or a recurrent neural network (RNN) portion. For example, at least a portion of the layers included in the DNN may correspond to a CNN, and another portion of the layers may correspond to an FCN. The CNN may be referred to as a convolutional layer (i.e., one or more convolutional layers), and the FCN may be referred to as a fully connected layer. In the case of the CNN, data input to each layer may be referred to as an input feature map (e.g., a tensor map, a 2D map, an ID vector, etc.), and data output from each layer may be referred to as an output feature map. The input feature map and the output feature map (e.g., a tensor map, a 2D map, an ID vector, etc.) may also be referred to as activation data, where the input feature map may be the activation results of a previous layer input to the current layer (or subsequent pooling and/or normalization layer(s) that provided the activation results from the previous layer), and where the output layer may be the activation results of the current layer (where subsequent pooling and/or normalization layers provided the activation result of the current layer). When a convolutional layer corresponds to an input layer, an input feature map of the input layer may be an input image.

After being trained based on deep learning, the neural network may perform an inference, according to its training, by mapping input data to output data, which may have a nonlinear relationship to each other. The deep learning may be a machine learning scheme for image or voice (as non-limiting examples) recognition from a large training data set, for example. The deep learning may be construed as an optimized problem-solving process of finding a point at which energy (e.g., loss or error) is minimized while training the neural network using training data (e.g., prepared training data).

Through supervised or unsupervised learning for example, a structure of the neural network, e.g., resultant parameters within a model, may be obtained, and the input data and the output data may be mapped to each other through the parameters. The parameters may include connection weights e.g., within or between layers. When a width and a depth of the neural network are sufficiently large, the neural network may have a capacity sufficient to implement an arbitrary trained function. The performance of the neural network may increase with the amount of training data that it is trained with.

The neural network may be trained in advance, that is, before the neural network starts performing inferences. The neural network may be said to start when the neural network is ready for performing inferences. For example, starting the neural network may include loading the neural network into a memory and/or loading input data (for inference) to the neural network after the neural network is loaded into the memory.

The feature extraction model 110 may extract feature maps from the input image 101. The feature maps may be referred to as a feature map set. The feature extraction model 110 may include at least one convolutional layer and at least one pooling layer. The feature extraction model 110 may generate the feature map set using the at least one convolutional layer and the at least one pooling layer.

The feature map set may be divided into a plurality of feature representations. For example, the feature map set may have a dimension of W*H*C (width, height, channel) and may include W*H feature representations. In this case, a feature representation may correspond to a pixel vector. Each feature representation may include local information of a specific region of the input image 101 and may be referred to as a local feature representation. For example, the input image 101 may be divided into grid cells, and each local feature representation may correspond to a specific grid cell of the input image 101. However, a corresponding region of each local feature representation may be represented by the feature extraction model 110 in various ways.

The first recognition model 120 may estimate the first recognition result 102. The first recognition result 102 may include a detection result. The first recognition model 120 may estimate detection results, where each detection result corresponds to each of the local feature representations, respectively. For example, a local feature representation for a detection result may be a vector, and the first recognition model 120 may determine vector values corresponding to the detection result. In this example, the detection result may include bounding box information, objectness information (e.g., probability an object exists), and/or class information, corresponding to each of the local feature representations. The detection result may include any information representing an object. The first recognition model 120 may determine the first recognition result 102 by integrating detection results of the local feature representations.

The first recognition result 102 may be based on local information at the level of a grid cell (e.g., pixel level) and therefore may be vulnerable to unseen data (e.g., objects or object classes) during training. The feature fusion model 130 may derive global feature representations from the local feature representations. The feature fusion model 130 may determine a global feature representation corresponding to the input image 101 by fusing (e.g., weighted sums) the local feature representations, and the second recognition model 140 may estimate the second recognition result 103 corresponding to the global feature representation. One or more of the feature extraction model 110, the first recognition model 120, the feature fusion model 130, and the second recognition model 140 may be trained as an integrated model, where the training of one or more of the models influences the training of one or more other models, or where all models are trained together. Recognition performance may be improved as local information and global information are applied together when training the integrated model. In addition, an orientation to a specific recognition task may be formed based on a structure of the feature fusion model 130 and the second recognition model 140 and/or a design of the training process.

In an example, the feature fusion model 130 may generate pooling results corresponding to the local feature representations by performing a pooling operation (e.g., a global average pooling operation) and the feature fusion model 130 may determine the global feature representation by fusing the pooling results. In another example, the feature fusion model 130 may determine the global feature representation by performing an attention mechanism (e.g., using a vision transformer model) using pre-trained query data. For example, the feature fusion model 130 may include a vision transformer. Based on fusion of the local feature representations, the global feature representation may include global information representing the local feature representations, and recognition performance may be improved because the global information is applied to the recognition process.

The second recognition model 140 may estimate the second recognition result 103 corresponding to the global feature representation. The second recognition result 103 may include information corresponding to a current target task (e.g., scene understanding for the input image 101). The second recognition result 103 may include a classification result. For example, the classification result may be one or more of multi-class classification information (e.g., probabilities of the presence of multiple classes of objects), context classification information (e.g., categorizing a scene), and/or object count information (e.g., probabilities of respective numbers of objects). Other classification information suitable for various purposes of a specific task may be set, and the classification result may include such classification information.

A training loss may be designed such that a result of a specific target recognition task is represented as the second recognition result 103, and the feature extraction model 110, the first recognition model 120, the feature fusion model 130, and the second recognition model 140 may be trained using the training loss. In a training process, the second recognition model 140 may generate the second recognition result 103 in a way that reduces the training loss. Similarly, the feature fusion model 130 may be trained to fuse the local feature representations and generate the global feature representation in a way that reduces the training loss. In addition, the feature extraction model 110 may be trained to generate the local feature representations in a way that reduces the training loss. The first recognition model 120 may be trained based on corresponding local feature representations. Accordingly, the feature extraction model 110, the first recognition model 120, and the feature fusion model 130 may have a task-oriented feature corresponding to the target recognition task.

Figure 2:
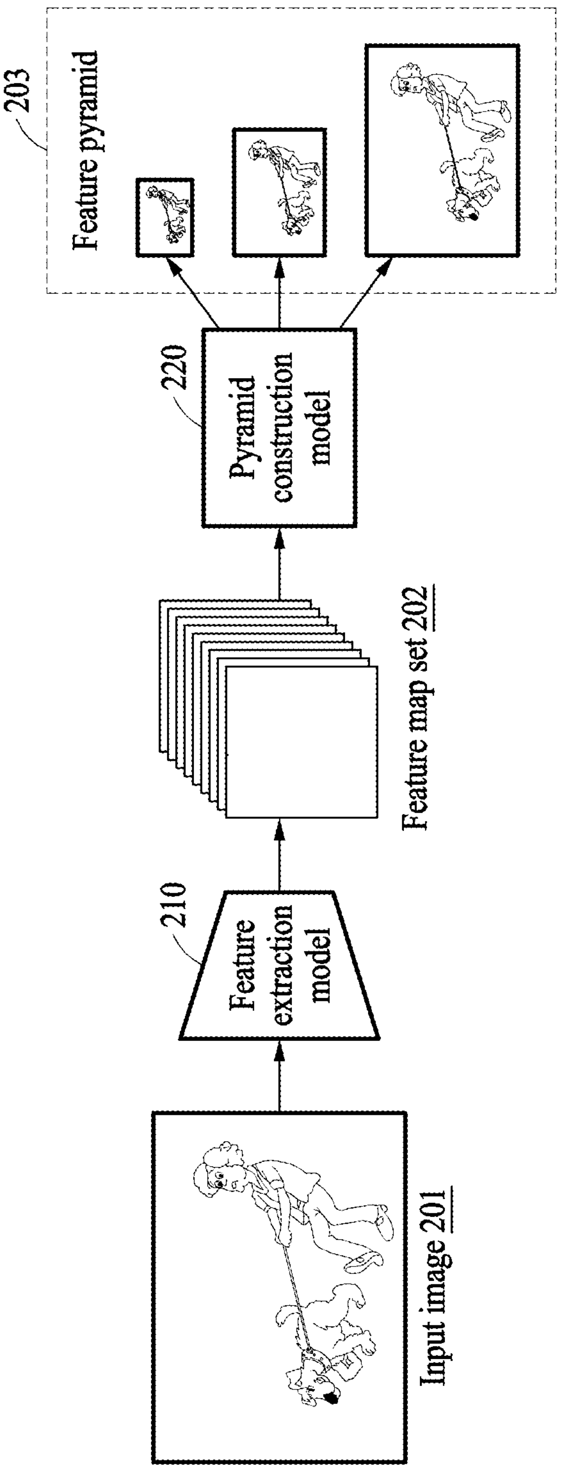
FIG. 2 illustrates an example of feature extraction, according to one or more embodiments.

FIG. 2 illustrates an example of feature extraction, according to one or more embodiments. Referring to FIG. 2, a pyramid construction model 220 may be arranged after a feature extraction model 210. After the feature extraction model 210 extracts a feature map set 202 from an input image 201, the pyramid construction model 220 may construct a feature pyramid 203 corresponding to the feature map set 202. The feature pyramid 203 may include feature map sets of various scales. Although the example feature pyramid 203 includes feature map sets of three scales, other numbers of scales are available in other examples. When the pyramid construction model 220 is used, a first recognition model (e.g., the first recognition model 120 of FIG. 1) may generate a first recognition result (e.g., the first recognition result 102 of FIG. 1) corresponding to the feature pyramid 203. A feature fusion model (e.g., the feature fusion model 130 of FIG. 1) may determine a global feature representation, using feature map sets of one or more scales of the feature pyramid 203.

Figure 3:
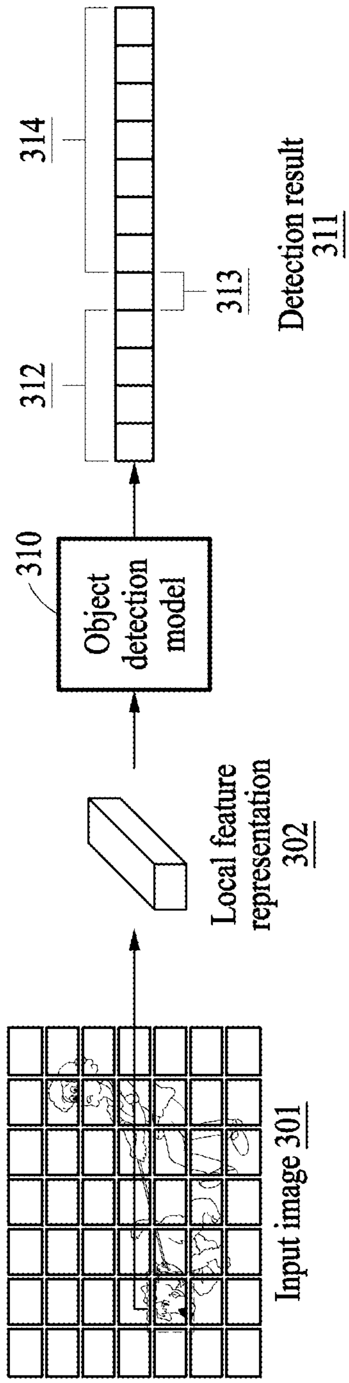
FIG. 3 illustrates an example of deriving a detection result from a local feature representation, according to one or more embodiments.

FIG. 3 illustrates an example of deriving a detection result from a local feature representation, according to one or more embodiments. Referring to FIG. 3, an object detection model 310 may generate a detection result 311 corresponding to a local feature representation 302 of an input image 301. The object detection model 310 may correspond to a first recognition model (e.g., the first recognition model 120 of FIG. 1), and the detection result 311 may correspond to a first recognition result (e.g., the first recognition result 102 of FIG. 1).

The detection result 311 may include bounding box information 312, objectness information 313, and/or class information 314, corresponding to the local feature representation 302. The detection result 311 may include other information related to an object. The bounding box information 312 may include position information and size information of a bounding box corresponding to the object. The objectness information 313 may indicate whether the local feature expression 302 corresponds to the object. The class information 314 may represent a class of the object. The objectness information 313 may be omitted.

Figure 4:
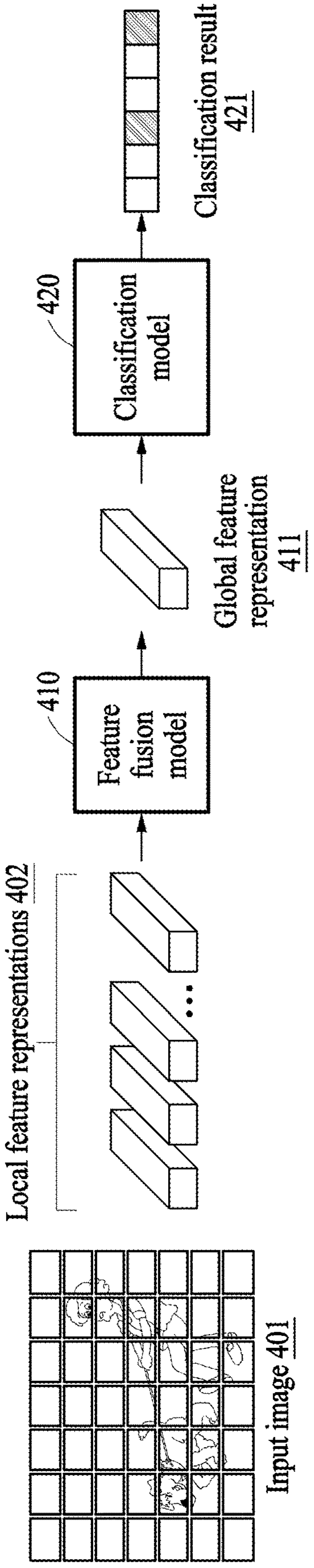
FIG. 4 illustrates an example of deriving a classification result from a global feature representation, according to one or more embodiments.

FIG. 4 illustrates an example of deriving a classification result from a global feature representation, according to one or more embodiments. Referring to FIG. 4, local feature representations 402 may be extracted from an input image 401, and a feature fusion model 410 may determine a global feature representation 411 by fusing the local feature representations 402. A classification model 420 may determine a classification result 421 corresponding to the global feature representation 411. The classification model 420 may correspond to a second recognition model (e.g., the second recognition model 140 of FIG. 1), and the classification result 421 may correspond to a second recognition result (e.g., the second recognition result 103 of FIG. 1). The classification result 421 may include one or more of multi-class classification information, context classification information, and/or object count information. Other classification information suitable for a purpose of a specific task may be determined, and the classification result may include such classification information.

Figure 5:
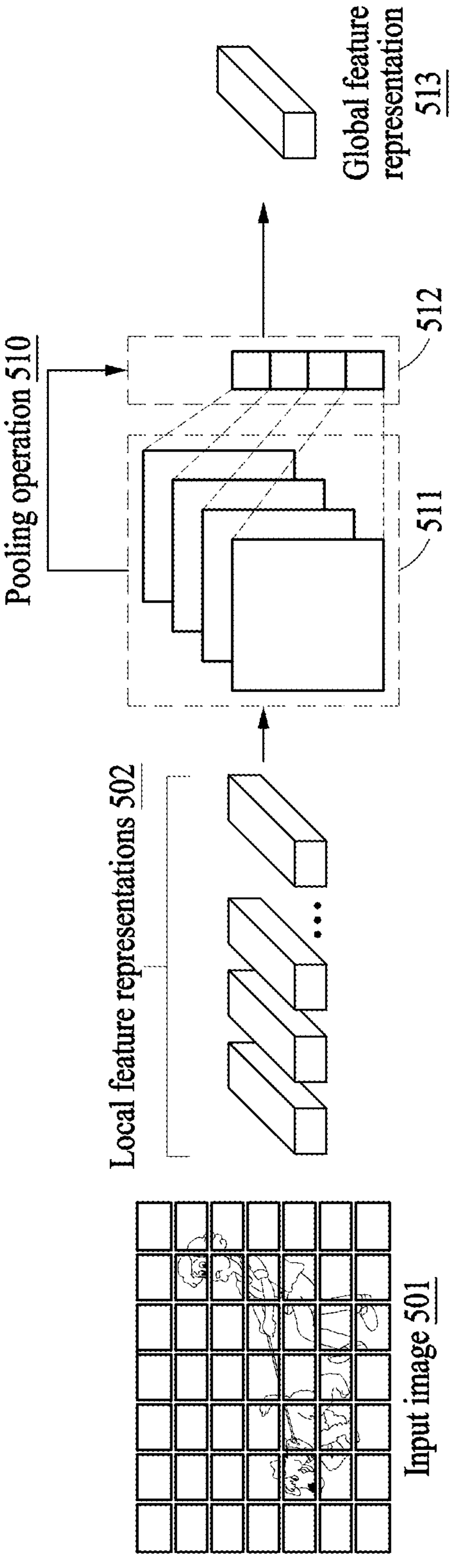
FIG. 5 illustrates an example of determining a global feature representation by fusing local feature representations through a pooling operation, according to one or more embodiments.

FIG. 5 illustrates an example of determining a global feature representation by fusing local feature representations through a pooling operation, according to one or more embodiments. Referring to FIG. 5, local feature representations 502 may be extracted from an input image 501, and a global feature representation 513 may be generated through a pooling operation 510 that pools the local feature representations 502. For example, the local feature representations 502 may be represented as a feature map set 511, pooling results 512 respectively corresponding to feature maps of the feature map set 511 may be determined, and the global feature representation 513 may be determined by fusing (combining) the pooling results 512.

Figure 6:
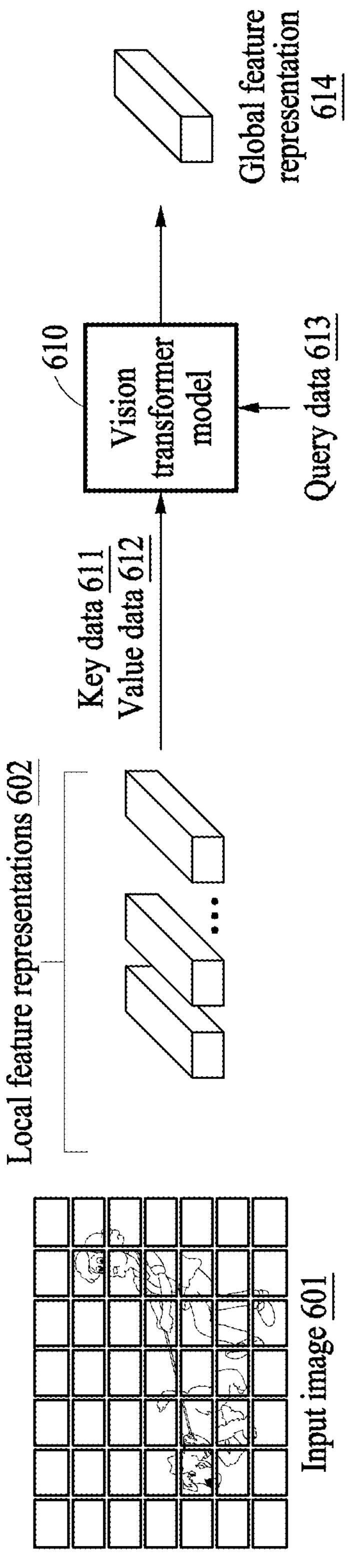
FIG. 6 illustrates an example of determining a global feature representation by fusing local feature representations through an attention mechanism, according to one or more embodiments.

FIG. 6 illustrates an example of determining a global feature representation by fusing local feature representations through an attention mechanism using a transformer model, according to one or more embodiments. Referring to FIG. 6, local feature representations 602 may be extracted from an input image 601, and transformer key data 611 and transformer value data 612 may be determined based on the local feature representations 602. The key data 611 and the value data 612 may have the same data value. Transformer query data 613 may be pre-trained for a current type of recognition task. Thus, a vision transformer model 610 may determine a global feature representation 614 by performing an attention mechanism based on the key data 611, the value data 612, and the query data 613. The vision transformer model 610 may correspond to a feature fusion model (e.g., the feature fusion model 130 of FIG. 1). The vision transformer model 610 may determine a weight representing a computed similarity between the key data 611 and the query data 613, determine a weighted sum of the value data 612 by using the weight, and determine the global feature representation 614 based on the weighted sum.

FIGS. 7A, 7B, 8A, and 8B illustrate examples of deriving a classification result from an input image. Referring to the example of FIG. 7A, local feature representations 702 may be extracted from an input image 701, and key data 711 and value data 712 may be determined based on the local feature representations 702. A vision transformer model 710 may determine a global feature representation 714 by performing an attention mechanism based on the key data 711, the value data 712, and query data 713. A classification model 720 may estimate multi-class classification information 721 corresponding to the global feature representation 714.

The multi-class classification information 721 may indicate whether the input image 701 has objects of a plurality of classes of interest. For example, the multi-class classification information 721 may include a probability that the input image 701 has an object of each class of interest. The vision transformer model 710 and the classification model 720 may be trained such that a training loss of the multi-class classification information 721 is reduced. More specifically, the query data 713 may be trained to derive the global feature representation 714 that reduces the training loss, and the classification model 720 may be trained to estimate the multi-class classification information 721 that reduces the training loss.

In a process of training the vision transformer model 710 and the classification model 720, a feature extraction model (e.g., the feature extraction model 110 of FIG. 1) and a first recognition model (e.g., the first recognition model 120 of FIG. 1) associated with the local feature representations 702 may also be trained with the vision transformer model 710 and the classification model 720. For example, the feature extraction model and the first recognition model may be a general-purpose detector for detecting objects of general-purpose classes, classes of interest may be selected from among the general-purpose classes, and a training process may be performed. In this case, an ability to detect an object of a class of interest of the feature extraction model and the first recognition model may be improved through additional training using the vision transformer model 710 and the classification model 720.

Figure 7A:
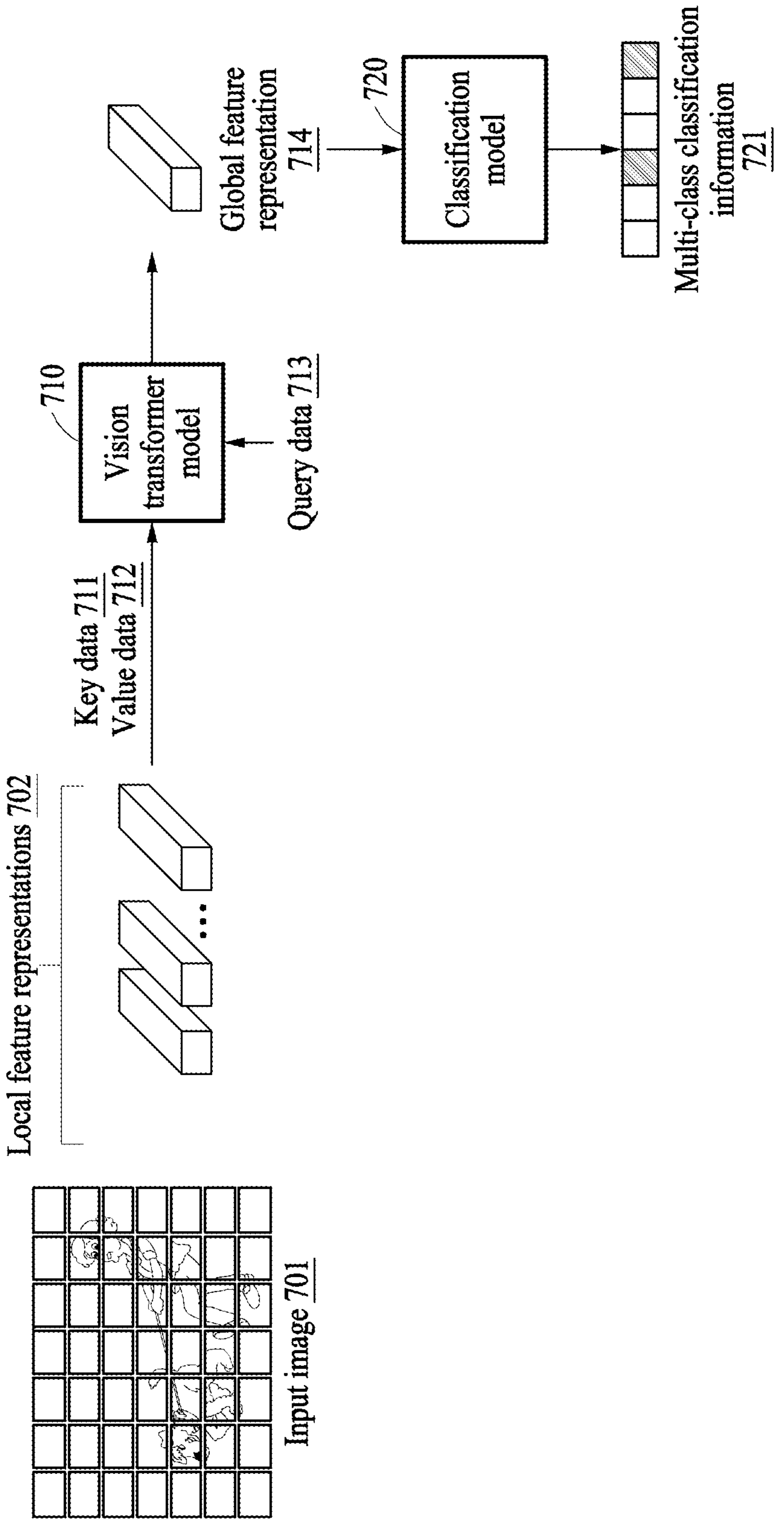
FIG. 7A illustrates an example of deriving a classification result from an input image, according to one or more embodiments.
Figure 7B:
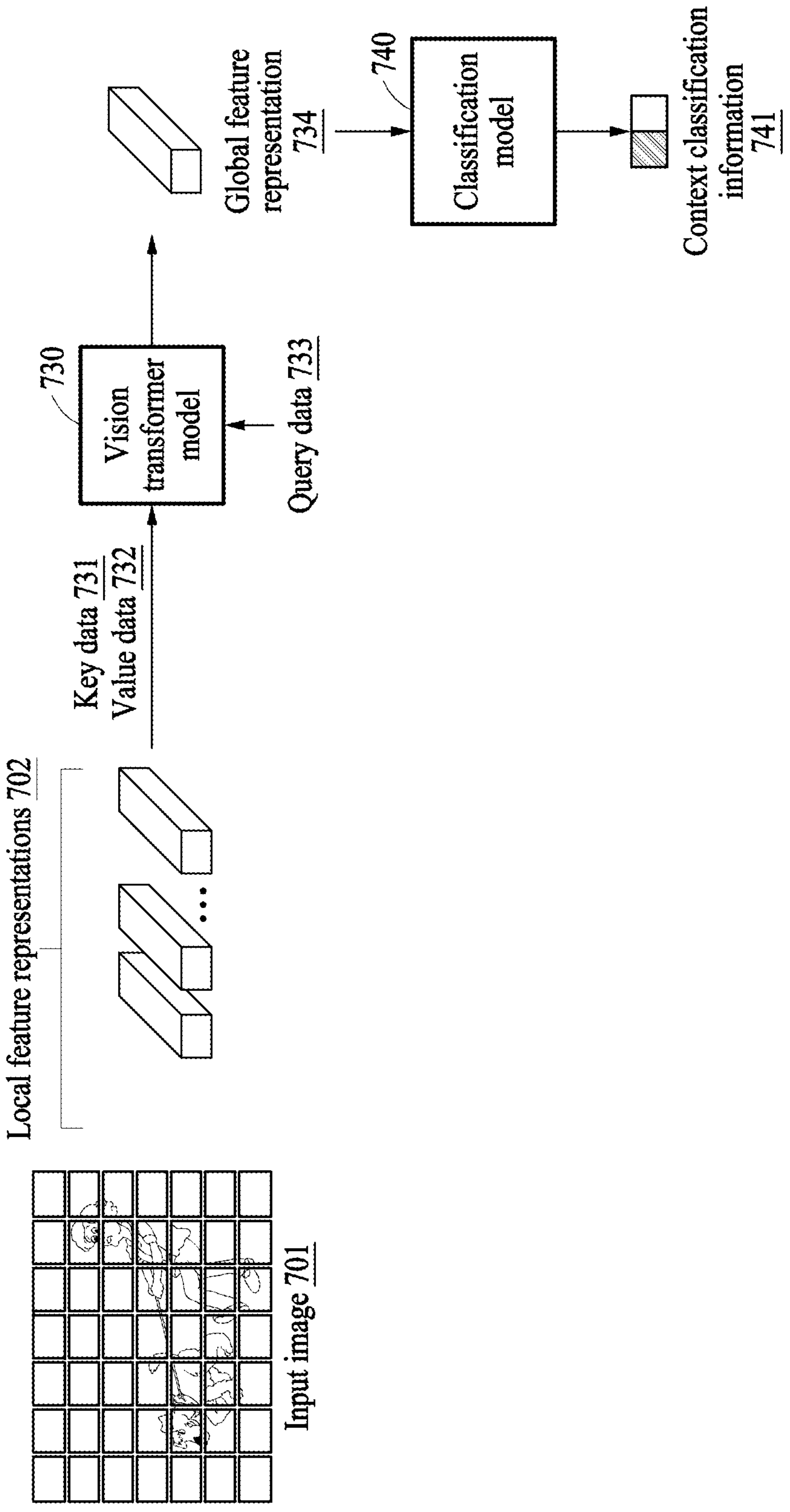
FIG. 7B illustrates an example of deriving a classification result from an input image, according to one or more embodiments.

Referring to the example of FIG. 7B, key data 731 and value data 732 may be determined based on local feature representations 702, and a vision transformer model 730 may determine a global feature representation 734 by performing an attention mechanism based on the key data 731, the value data 732, and query data 733. A classification model 740 may estimate context classification information 741 corresponding to the global feature representation 734. The context classification information 741 may indicate whether there is a specific context in an input image 701. For example, the input image 701 may be a video conference image, and the context classification information 741 may indicate whether there are security issues in a current context, for example, whether there is an unauthorized capturing device, an unauthorized person, or the like.

A target recognition task of FIG. 7A is multi-class classification, and a target recognition task of FIG. 7B is context classification. A training result may have a different orientation based on a recognition task. For example, in the example of FIG. 7A, the vision transformer model 710, the query data 713, and the classification model 720 may be trained in a way that reduces a training loss based on the multi-class classification information 721, and in the example of FIG. 7B, the vision transformer model 730, the query data 733, and the classification model 740 may be trained in a way that reduces a training loss based on the context classification information 741. FIGS. 7A and 7B are examples of different models having different task orientations. Alternatively, FIGS. 8A and 8B are examples of a same model provided with different task orientations.

Figure 8A:
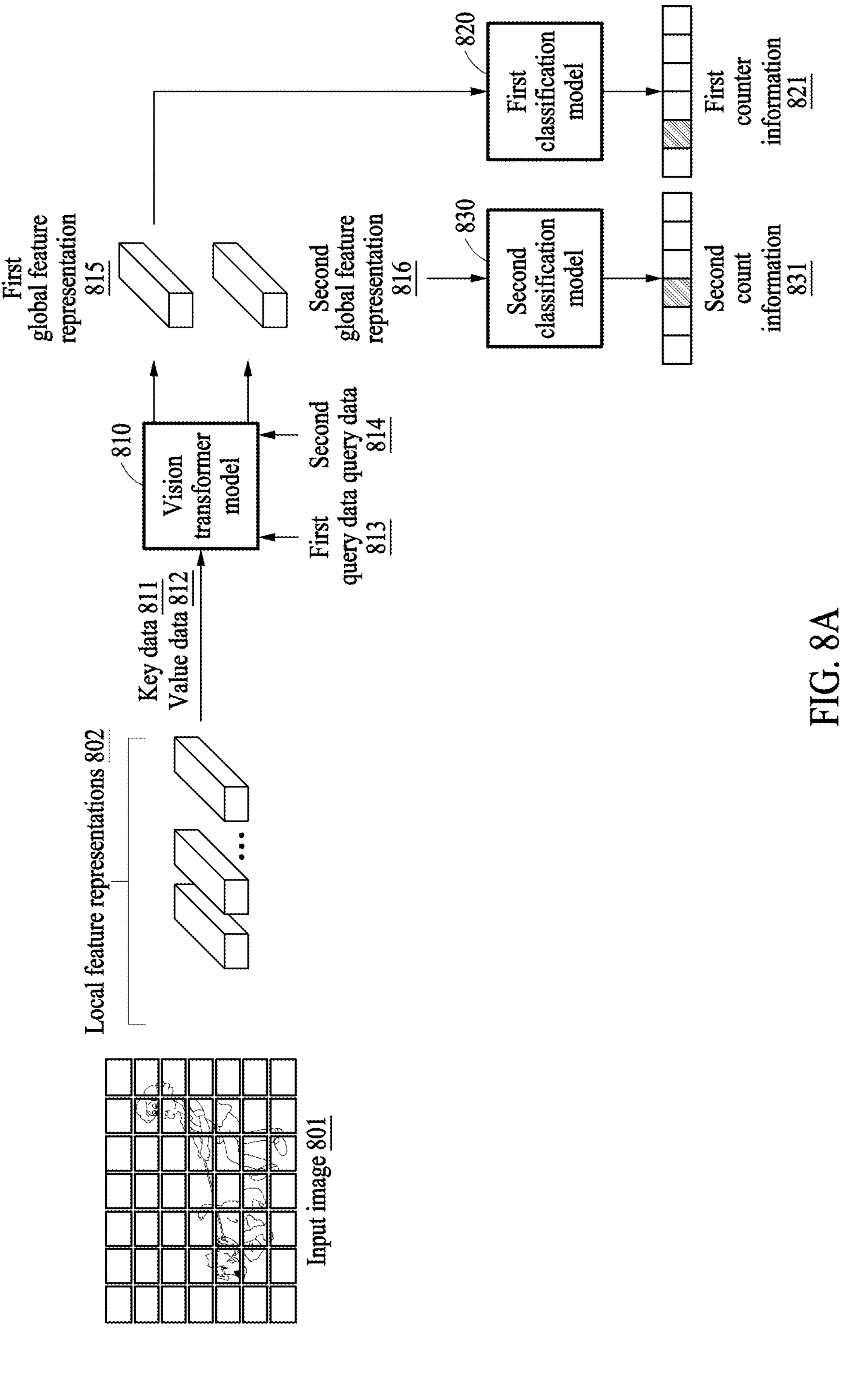
FIG. 8A illustrates an example of deriving a classification result from an input image, according to one or more embodiments.
Figure 8B:
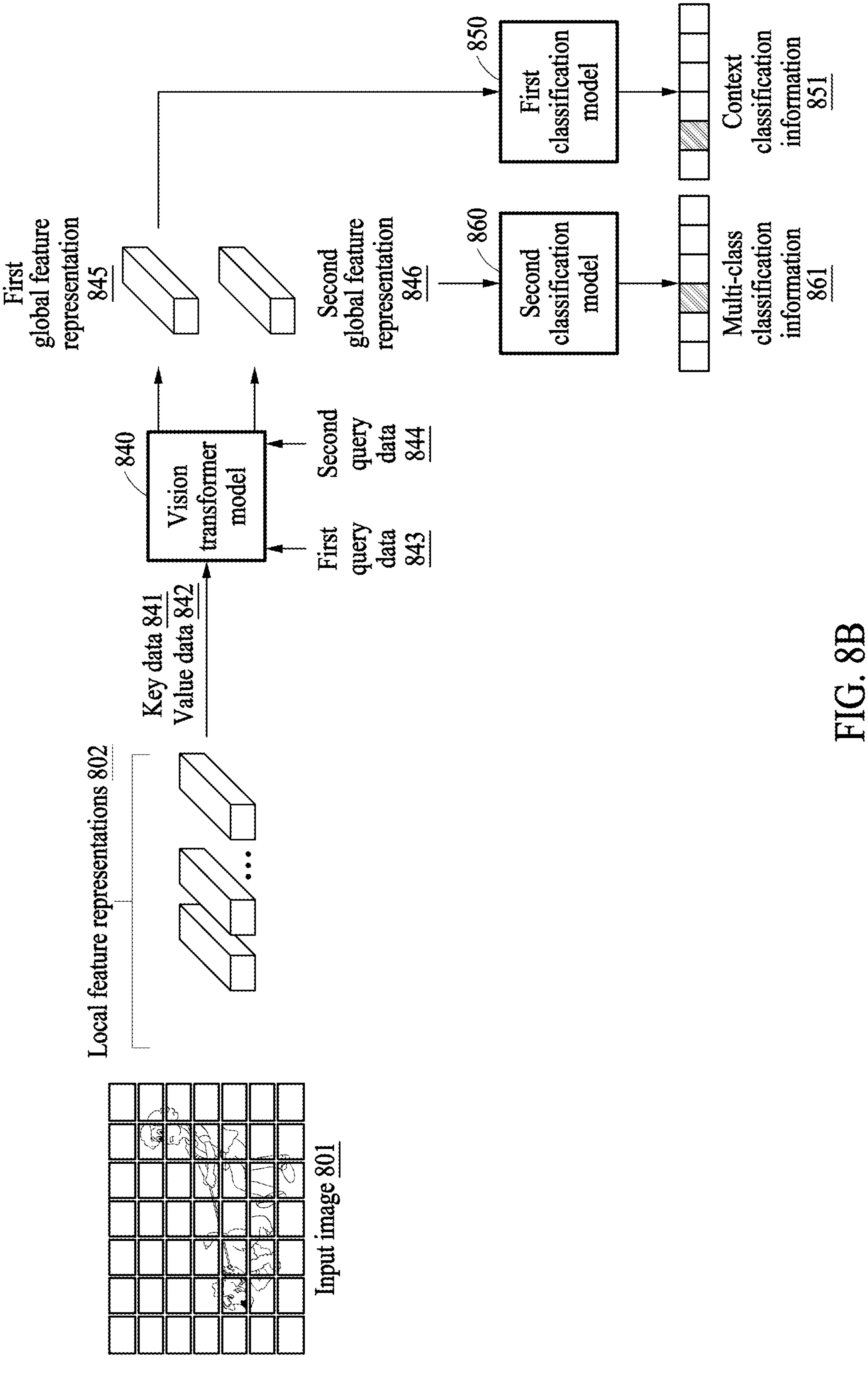
FIG. 8B illustrates an example of deriving a classification result from an input image, according to one or more embodiments.

Referring to the example of FIG. 8A, local feature representations 802 may be extracted from an input image 801, and key data 811 and value data 812 may be determined from the local feature representations 802. A vision transformer model 810 may determine a global feature representation for a current recognition task among a plurality of task candidates. For example, a first task candidate may be a task of estimating first count information 821 representing the number of objects of a first class of interest (e.g., bicycle) in the input image 801, and a second task candidate may be a task of estimating second count information 831 representing the number of objects of a second class of interest (e.g., automobile) in the input image 801.

First query data 813 and a first classification model 820 may be trained with training data corresponding to the first task candidate, and second query data 814 and a second classification model 830 may be trained with training data corresponding to the second task candidate. Accordingly, in a training stage, the vision transformer model 810 may be trained to determine a first global feature representation 815 specific to the first task candidate, based on the first query data 813, and the first classification model 820 may be trained to estimate the first count information 821 optimized for the first task candidate, based on the first global feature representation 815.

When the first task candidate is selected as a current recognition task for an inference stage, the vision transformer model 810 may determine the first global feature representation 815 based on the key data 811, the value data 812, and the first query data 813. Continuing with the inference stage, the first classification model 820 may estimate the first count information 821 from the first global feature representation 815. When the second task candidate is selected as a current recognition task, the vision transformer model 810 may determine a second global feature representation 816, based on the key data 811, the value data 812, and the second query data 814. And, continuing with the current interference/recognition task, the second classification model 830 may estimate the second count information 821 from the second global feature representation 816.

Another example is illustrated in FIG. 8B. Referring to the example of FIG. 8B, a first task candidate may be a task of estimating context classification information 851 (e.g., whether a scene is abnormal/normal), and a second task candidate may be a task of estimating multi-class classification information 861 (e.g., whether various classes of task-related objects are recognized). First query data 843 and a first classification model 850 may be trained with training data corresponding to the first task candidate, and second query data 844 and a second classification model 860 may be trained with training data corresponding to the second task candidate.

When the first task candidate is selected as a current recognition task for an inference stage, a vision transformer model 840 may determine a first global feature representation 845 based on key data 841, value data 842, and the first query data 843. Continuing with the current recognition task, the first classification model 850 may estimate the context classification information 851 corresponding to the first global feature representation 845. When the second task candidate is selected as a current recognition task, the vision transformer model 840 and the second classification model 860 may estimate the multi-class classification information 861 based on the second query data 844 and a second global feature representation 846.

FIGS. 8A and 8B each illustrate an example in which each recognition task has its own separate query data and its own separate global feature representation, but there may be examples in which recognition tasks each have separate respective query data yet both have a shared global feature representation. For example, there may be the first query data 813 for a first task candidate and the second query data 814 for a second task candidate, and when the vision transformer model 810 generates a global feature representation based on the first query data 813 and the second query data 814, a first classification result and a second classification result (each corresponding to the global feature representation) may be estimated.

Figure 9:
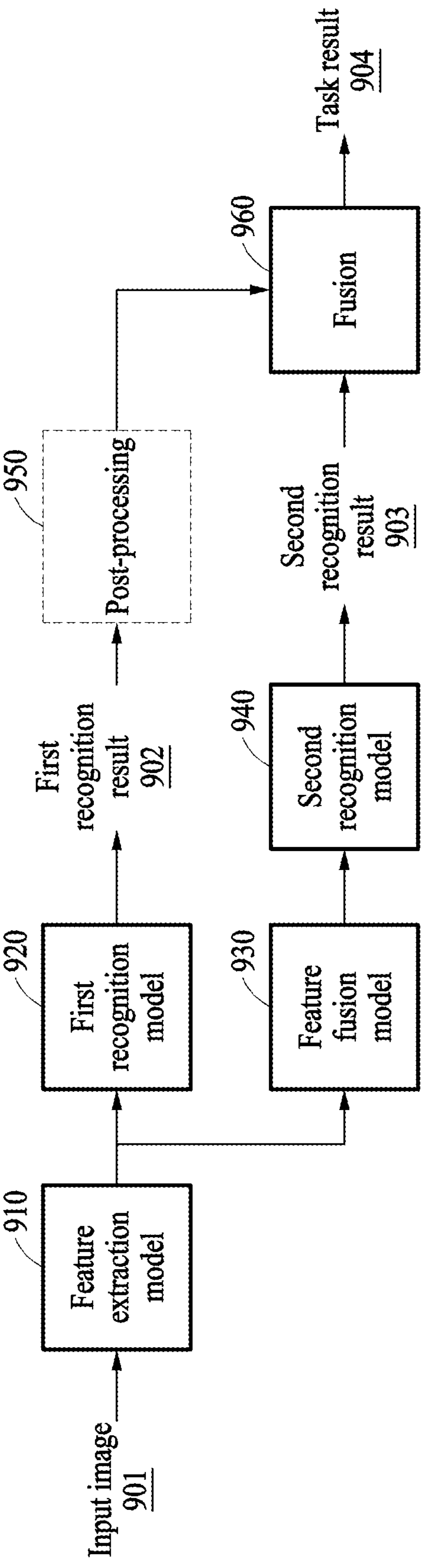
FIG. 9 illustrates an example of deriving a task result by fusing recognition results.

FIG. 9 illustrates an example of deriving a task result by fusing recognition results. Referring to FIG. 9, a feature extraction model 910 may extract local feature representations from an input image 901, and a first recognition model 920 may estimate a first recognition result 902 corresponding to the local feature representations. A feature fusion model 930 may determine a global feature representation corresponding to the input image 901 by fusing (e.g., averaging or weighted summing, concatenation, etc.) the local feature representations, and a second recognition model 940 may estimate a second recognition result 903 corresponding to the global feature representation.

The first recognition result 902 and the second recognition result 903 may be fused by a fusion block 960, and accordingly, a task result 904 of a current recognition task is determined. The first recognition result 902 may be post-processed by a post-processing block 950 before being fused with the second recognition result 903. For example, the first recognition result 902 may include an object detection result, and the second recognition result 903 may include a scene classification result. In this case, scene classification may be performed through post-processing of the object detection result, a scene classification result of the first recognition result 902 may be fused with the scene classification result of the second recognition result 903, and the task result 904 may be determined accordingly.

Figure 10A:
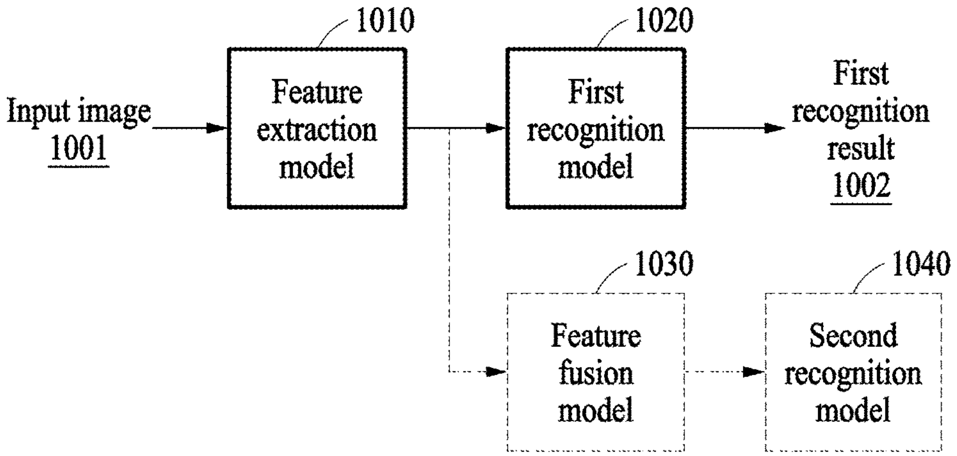
FIG. 10A illustrates an example of inference operation using a portion of recognition models, according to one or more embodiments.
Figure 10B:
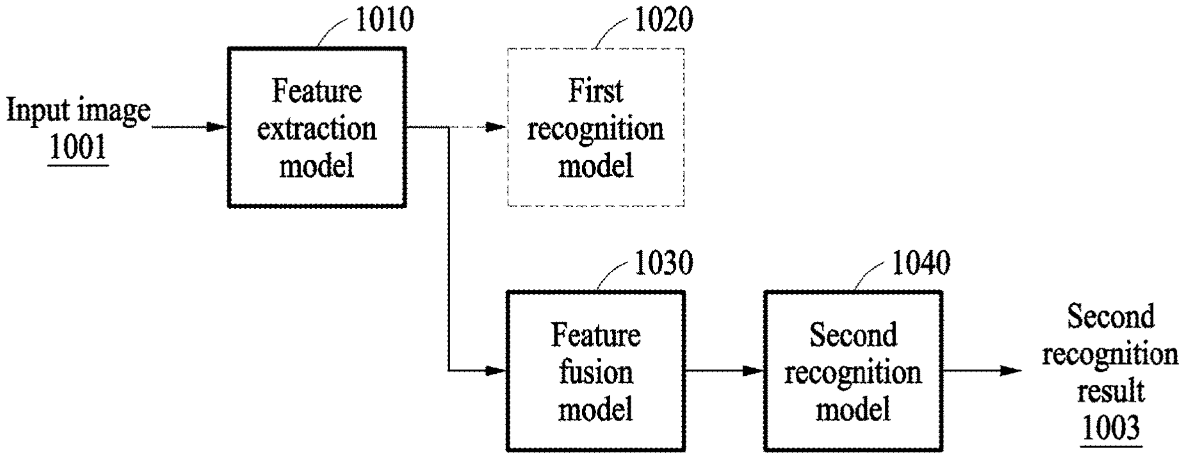
FIG. 10B illustrates an example of an inference operation using a portion of recognition models, according to one or more embodiments.

FIGS. 10A and 10B illustrate examples of inferencing using a portion of recognition models. Referring to the example of FIG. 10A, in a training stage, a feature extraction model 1010, a first recognition model 1020, a feature fusion model 1030, and a second recognition model 1040 may be trained with training data that is configured for a specific target task. After the training, in an inference stage, the feature fusion model 1030 and the second recognition model 1040 may be excluded from the inference stage, and only the feature extraction model 1010 and the first recognition model 1020 may be used for inference stage. The feature extraction model 1010 and the first recognition model 1020 may estimate a first recognition result 1002 of a target task based on an input image 1001. Although in this example the feature fusion model 1030 and the second recognition model 1040 are excluded from the trained recognition model used during the inference stage, the performance of the first recognition result 1002 for the target task may be improved, as they may be influenced by the feature fusion model 1030 and the second recognition model 1040 during the training stage.

Referring to the example of FIG. 10B, in an inference stage, a first recognition model 1020 may be excluded, and only a feature extraction model 1010, a feature fusion model 1030, and a second recognition model 1040 may be included in the trained recognition model and used for the inference stage. The feature extraction model 1010, the feature fusion model 1030, and the second recognition model 1040 may estimate a second recognition result 1003 of a target task based on an input image 1001. In this case, influenced by the first recognition model 1020 in the training stage, the second recognition result 1003 may have boosted performance for the target task.

Figure 11:
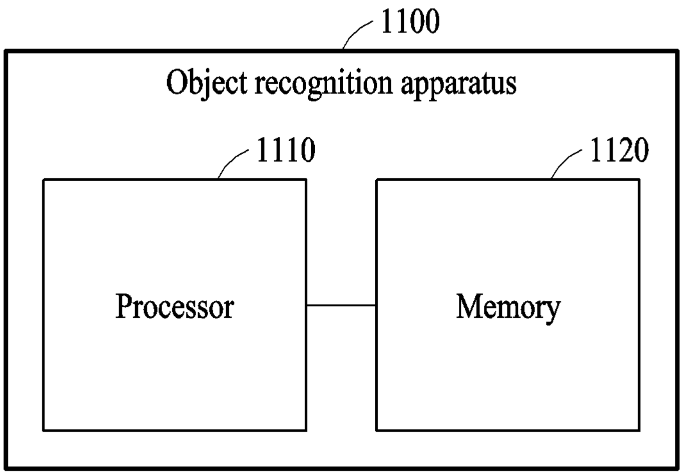
FIG. 11 illustrates an example of a configuration of an object recognition apparatus, according to one or more embodiments.

FIG. 11 illustrates an example of a configuration of an object recognition apparatus, according to one or more embodiments. Referring to FIG. 11, an object recognition apparatus 1100 may include a processor 1110 and a memory 1120. The memory 1120 may be connected to the processor 1110 and store instructions executable by the processor 1110, data to be processed by the processor 1110, or data processed by the processor 1110. The memory 1120 may include a non-transitory computer-readable medium, for example, high-speed random-access memory (RAM), and/or a non-volatile computer-readable storage medium (e.g., one or more disk storage devices, flash memory devices, or other non-volatile solid state memory devices).

The processor 1110 may execute instructions (e.g., stored in a memory) to perform any one, any combination, or all of the operations described herein with reference to any one, any combination of, or all of FIGS. 1 through 10B and 12 through 14. For example, the processor 1110 may extract feature maps including local feature representations from an input image, determine a global feature representation corresponding to the input image by fusing the local feature representations, and perform a recognition task on the input image based on the local feature representations and the global feature representation. In addition, the description provided with reference to FIGS. 1 through 10B and 12 through 14 may apply to the object recognition apparatus 1100.

Figure 12:
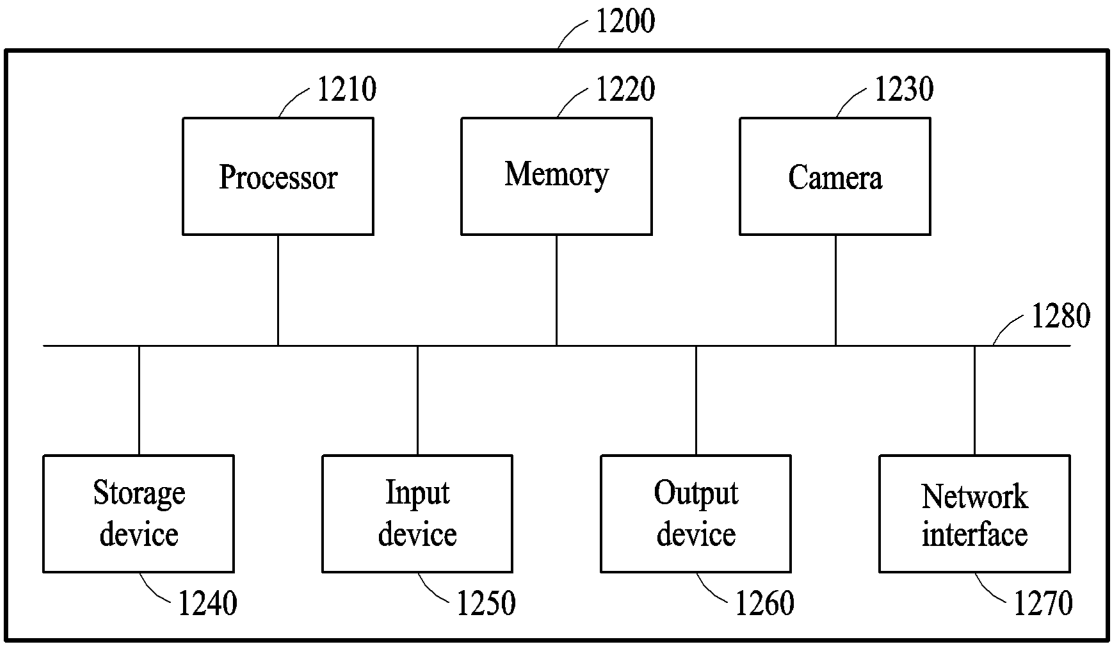
FIG. 12 illustrates an example of a configuration of an electronic apparatus, according to one or more embodiments.

FIG. 12 illustrates an example of a configuration of an electronic apparatus, according to one or more embodiments. Referring to FIG. 12, an electronic apparatus 1200 may include a processor 1210, a memory 1220, a camera 1230, a storage device 1240, an input device 1250, an output device 1260, and a network interface 1270 that may communicate with each other through a communication bus 1280. For example, the electronic apparatus 1200 may be implemented as, or in, for example, a mobile device, such as a mobile phone, a smartphone, a personal digital assistant (PDA), a netbook, a tablet computer, a laptop computer, or the like, a wearable device such as a smart watch, a smart band, smart glasses, or the like, a home appliance such as a television (TV), a smart TV, a refrigerator, or the like, a security device such as a door lock or the like, a vehicle, such as an autonomous vehicle, a smart vehicle, or the like, etc. The electronic apparatus 1200 may include, structurally and/or functionally, the object recognition apparatus 1100 of FIG. 11.

The processor 1210 may execute instructions or functions to be executed by the electronic apparatus 1200. For example, the processor 1210 may process the instructions stored in the memory 1220 or the storage device 1240. The processor 1210 may be configured to perform any of the operations described with reference to FIGS. 1 through 11, 13, and 14. The memory 1220 may include a computer-readable storage medium or a computer-readable storage device. The memory 1220 may store instructions to be executed by the processor 1210 and may store related information while instructions (e.g., software in the form of processor-executable instructions) and/or an application is executed by the electronic apparatus 1200. In an example, the processor 1210 may correspond to the processor 1100 of FIG. 11, and/or the memory 1220 may correspond to the memory 1120 of FIG. 11.

The camera 1230 may capture a photo and/or a video. For example, the camera 1230 may generate any of the input images mentioned herein. The storage device 1240 may include a computer-readable storage medium or a computer-readable storage device. The storage device 1240 may persistently store a greater amount of information than the memory 1220. For example, the storage device 1240 may include a magnetic hard disk, an optical disc, a flash memory, a floppy disk, or other non-volatile memories.

The input device 1250 may provide an input, e.g., when manipulated by a user. For example, the input may be a keyboard and/or a mouse input, a touch input, a voice input, an image input (other than through the capturing of the camera 1230), etc. For example, the input device 1250 may include a keyboard, a mouse, a touch screen, a microphone, or any other device that detects manipulation by the user and provides the corresponding input to the electronic device 1200. The output device 1260 may provide an output of the electronic device 1200 to the user through a visual, auditory, and/or haptic rendering. The output device 1260 may include, for example, a display, a touch screen, a speaker, a vibration generator, and/or any other device that provides the output. The network interface 1270 may communicate with an external device through a wired and/or wireless network.

Figure 13:
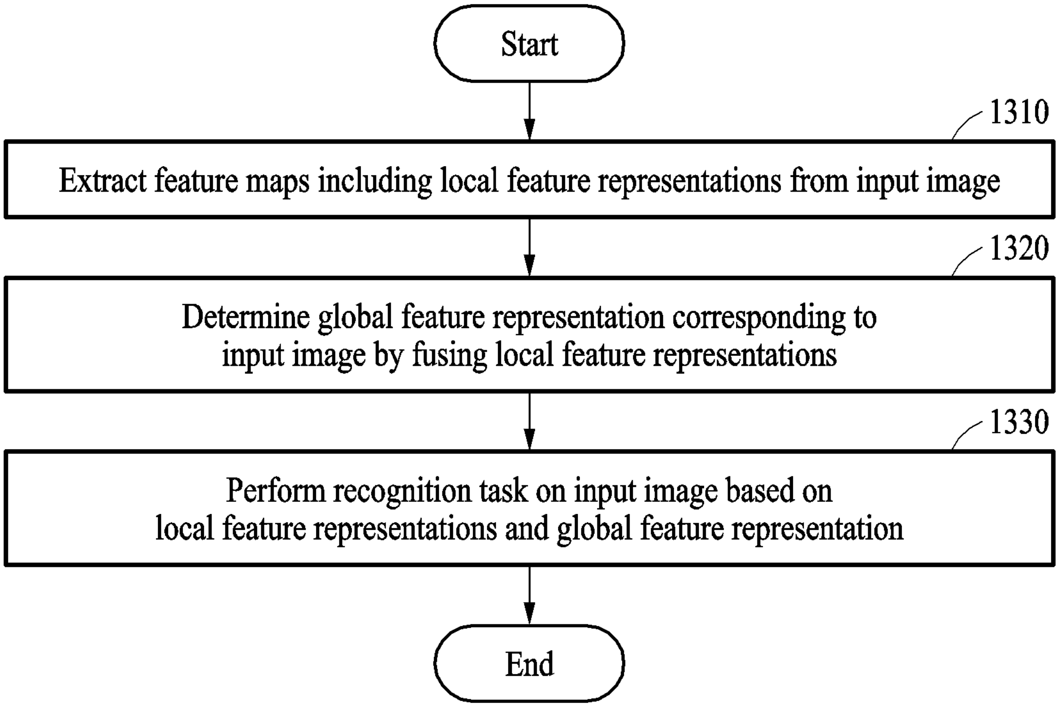
FIG. 13 illustrates an example of an object recognition method, according to one or more embodiments.

FIG. 13 illustrates an example of an object recognition method, according to one or more embodiments. Referring to FIG. 13, in operation 1310, an object recognition apparatus may extract feature maps including local feature representations from an input image.

In operation 1320, the object recognition apparatus may determine a global feature representation corresponding to the input image by fusing the local feature representations. In an example, the object recognition apparatus may determine the global feature representation by fusing pooling results respectively corresponding to the local feature representations. In another example, the object recognition apparatus may determine the global feature representation by performing an attention mechanism of a transformer using transformer query data pre-trained for, and selected in response to, a recognition task. The object recognition apparatus may determine transformer key data and transformer value data corresponding to the local feature representations, determine a weighted sum of the transformer value data based on similarity between the transformer key data and the transformer query data, and determine the global feature representation based on the weighted sum.

In operation 1330, the object recognition apparatus may perform the recognition task on the input image based on the local feature representations and the global feature representation. The object recognition apparatus may estimate a first recognition result corresponding to the local feature representations by using a first recognition model and may estimate a second recognition result corresponding to the global feature representation by using a second recognition model. The first recognition model may be an object detection model for estimating a detection result corresponding to each of the local feature representations, and the second recognition model may be a classification model for estimating a classification result corresponding to the global feature representation. The detection result may include bounding box information, objectness information, and/or class information (corresponding to each of the local feature representations) and the classification result may include multi-class classification information, context classification information, and/or object count information. The first recognition model and the second recognition model may be trained as an integrated model, where, during training, the training of one or more of the models affects the training of one or more other of the models.

The object recognition apparatus may determine a task result of the recognition task by fusing the first recognition result and the second recognition result. The recognition task may correspond to one of various task candidates, and the object recognition apparatus may determine the global feature representation by performing an attention mechanism based on query data corresponding to the recognition task (the query data may be selected from among a series of query data pre-trained for the respective task candidates). In addition, the description provided with reference to FIGS. 1 through 12 and 14 may apply to the object recognition method.

Figure 14:
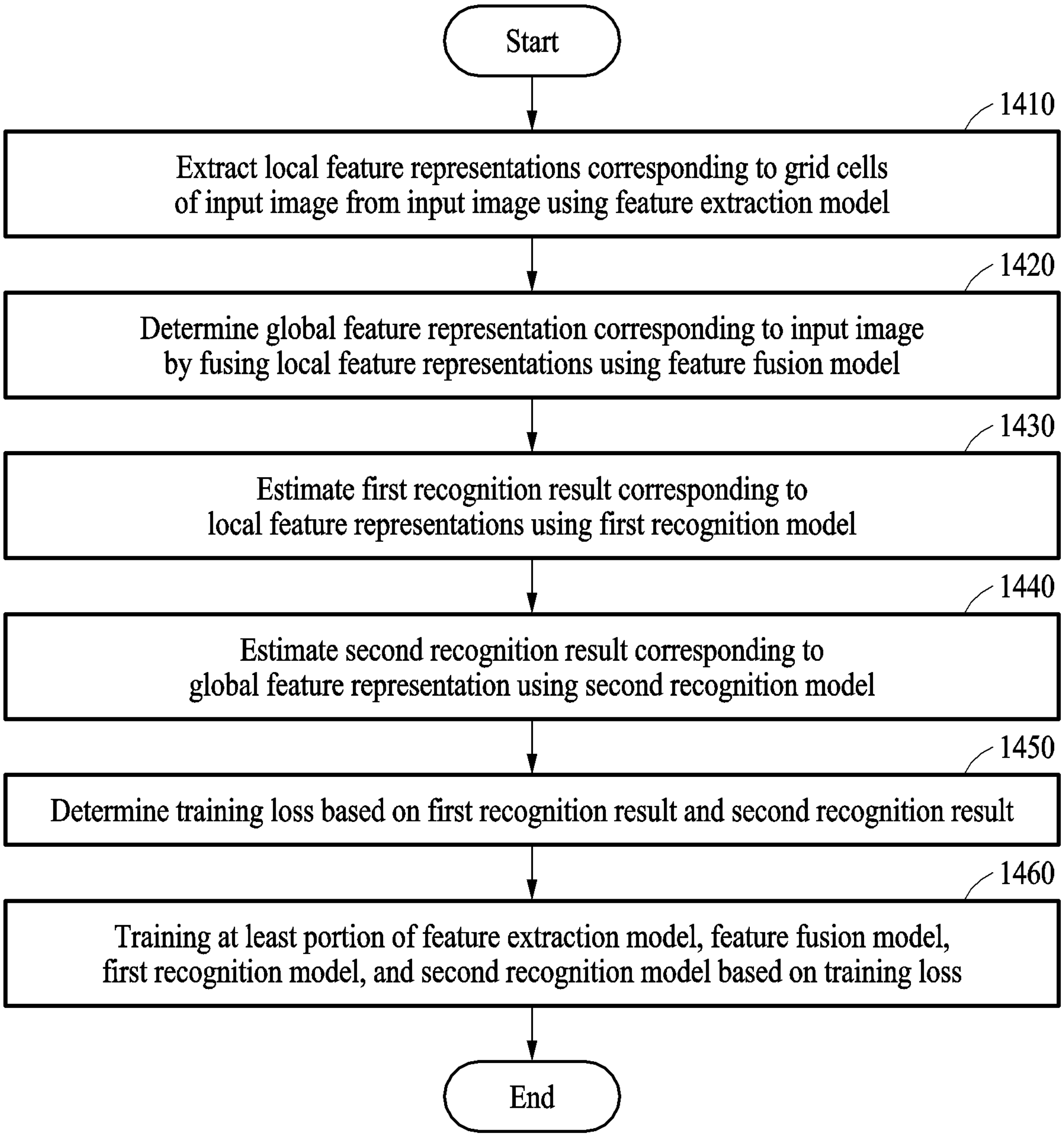
FIG. 14 illustrates an example of a training method, according to one or more embodiments.

FIG. 14 illustrates an example of a training method, according to one or more embodiments. Referring to FIG. 14, in operation 1410, an object recognition apparatus may use a feature extraction model to extract, from an input image, feature maps that include local feature representations. In operation 1420, the object recognition apparatus may determine a global feature representation corresponding to the input image by using a feature fusion model to fuse the local feature representations. In operation 1430, the object recognition apparatus may use a first recognition model to estimate a first recognition result corresponding to the local feature representations.

In operation 1440, the object recognition apparatus may use a second recognition model to estimate a second recognition result corresponding to the global feature representation. In operation 1450, the object recognition apparatus may determine a training loss based on the first recognition result and the second recognition result. The second recognition model may include a plurality of classification models corresponding to respective task candidates, the feature fusion model may determine the global feature representation by performing an attention mechanism based on query data corresponding to a current task candidate among the task candidates, and the object recognition apparatus may determine a training loss by applying a classification result of a classification model corresponding to the current task (the classification model selected from among the classification models) as the second recognition result.

In operation 1460, the object recognition apparatus may train the feature extraction model, the feature fusion model, the first recognition model, and/or the second recognition model, based on the training loss. The first recognition model and the second recognition model may be trained as an integrated model, the training of each affecting the training of the other. In addition, the description provided with reference to FIGS. 1 through 13 may apply to the training method.

The computing apparatuses, the vehicles, the electronic devices, the processors, the memories, the image sensors, the vehicle/operation function hardware, the ADAS/AD systems, the displays, the information output system and hardware, the storage devices, and other apparatuses, devices, units, modules, and components described herein with respect to FIGS. 1-11 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIM D) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-Res, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A processor-implemented method, the method comprising:

extracting feature maps comprising local feature representations from an input image;

generating a global feature representation corresponding to the input image by fusing the local feature representations;

estimating a first recognition result corresponding to the local feature representations, using a first recognition model, and estimating a second recognition result corresponding to the global feature representation, using a second recognition model, wherein the second recognition model comprises a classification model configured to estimate a classification result from the global feature representation; and performing a recognition task on the input image based on the first recognition result corresponding to the local feature representations and the second recognition result corresponding to the global feature representation.

2. The method of claim 1, wherein the generating of the global feature representation comprises:

fusing pooling results corresponding to the local feature representations.

3. The method of claim 2, wherein the pooling comprises global average pooling.

4. The method of claim 1, wherein the generating of the global feature representation comprises:

performing an attention mechanism using query data pre-trained in association with the recognition task.

5. The method of claim 4, wherein the generating of the global feature representation by performing the attention mechanism comprises:

determining key data and value data corresponding to the local feature representations;

determining a weighted sum of the value data based on similarity between the key data and the query data; and determining the global feature representation based on the weighted sum.

6. The method of claim 1, wherein the first recognition model comprises:

an object detection model configured to estimate a detection result from the local feature representations.

7. The method of claim 6, wherein the detection result comprises:

one or more of bounding box information, objectness information, or class information, and wherein the classification result comprises:

one or more of multi-class classification information, context classification information, or object count information.

8. The method of claim 6, further comprising training the first model and training the second model, wherein the training the first recognition model affects the training of the second recognition model, and the training of the second recognition model affects the training of the first recognition model.

9. The method of claim 8, wherein the training of the first model and the training of the second model comprises:

using an in-training feature extraction model, or a trained feature extraction model, to extract training feature maps comprising in-training local feature representations from a training input image;

using an in-training feature fusion model, or a trained fusion model, to determine a training global feature representation corresponding to the training input image by fusing the training local feature representations;

using an in-training first recognition model to estimate a training first recognition result corresponding to the training local feature representations;

using an in-training second recognition model to estimate a training second recognition result corresponding to the training global feature representation; and generating the first model and the second model by training the in-training first recognition model and the in-training second recognition model together based on the training first recognition result and the training second recognition result.

10. The method of claim 6, wherein the performing of the recognition task further comprises:

determining a task result recognized by the recognition task by fusing the first recognition result and the second recognition result.

11. The method of claim 1, wherein the recognition task corresponds to:

one of plural task candidates, the task candidates having respectively associated pre-trained query data items, and wherein the generating of the global feature representation comprises:

selecting, from among the pre-trained query data items, a query data item associated with the recognition task; and determining the global feature representation by performing an attention mechanism based on the selected query data item.

12. The method of claim 1, further comprising capturing the input image using a camera.

13. A processor-implemented method, the method comprising:

using a feature extraction model to extract feature maps comprising local feature representations from an input image;

using a feature fusion model to determine a global feature representation corresponding to the input image by fusing the local feature representations;

using a first recognition model to estimate a first recognition result corresponding to the local feature representations;

using a second recognition model to estimate a second recognition result corresponding to the global feature representation, wherein the second recognition model comprises a plurality of classification models respectively corresponding to task candidates; and based on the first recognition result corresponding to the local feature representations and the second recognition result corresponding to the global feature representation, training one or more of the feature extraction model, the feature fusion model, the first recognition model, or the second recognition model.

14. The method of claim 13, further comprising determining a training loss based on the first recognition result and the second recognition result, wherein the training is based on the training loss.

15. The training method of claim 13, wherein the first recognition model and the second recognition model are trained as an integrated model to influence the training of both the first recognition model and the second recognition model.

16. The method of claim 13, wherein the feature fusion model is configured to:

determine the global feature representation by performing an attention mechanism based on query data corresponding to a current task candidate among the task candidates, and wherein the determining of the training loss comprises:

determining the training loss by applying a classification result of a classification model corresponding to the current task candidate among the task candidates as the second recognition result.

17. The method of claim 13, wherein training the first recognition model affects training the second recognition model and training the second recognition model affects training the first recognition model.

18. A non-transitory computer-readable storage medium storing instructions that, when executed by a processor, configure the processor to perform the method of claim 1.

19. An electronic apparatus, comprising:

one or more processors comprising processing circuitry; and a memory comprising one or more storage media storing instructions that, when executed individually or collectively by the one or more processors, cause the electronic device to: extract feature maps comprising respective local feature representations from an input image;

determine a global feature representation corresponding to the input image by fusing the local feature representations;

use a first recognition model to estimate a first recognition result corresponding to the local feature representations;

use a second recognition model to estimate a second recognition result corresponding to the global feature representation, wherein the second recognition model comprises a classification model configured to estimate a classification result from the global feature representation; and perform a recognition task on the input image based on the first recognition result corresponding to the local feature representations and the second recognition result corresponding to the global feature representation.

20. The electronic apparatus according to claim 19, further comprising a camera configured to generate the input image.

21. The electronic apparatus of claim 19, wherein the processor is further configured to:

determine the global feature representation by fusing pooling results corresponding to the local feature representations.

22. The electronic apparatus of claim 19, wherein the processor is further configured to:

determine the global feature representation by performing an attention mechanism using query data pre-trained in response to the recognition task.

23. The electronic apparatus of claim 22, wherein the attention mechanism comprises a vision transformer model that performs the fusing based on similarity of keys and values of the query data.

24. The electronic apparatus of claim 19, wherein the processor is further configured to select between the first recognition model and the second recognition model based on the recognition task.

25. The electronic apparatus of claim 19, wherein the first recognition model comprises:

an object detection model configured to estimate a detection result corresponding to each of the local feature representations, and wherein the second recognition model comprises:

a classification model configured to estimate a classification result corresponding to the global feature representation.

26. The electronic apparatus of claim 25, wherein the processor is further configured to:

determine a task result of the recognition task by fusing the first recognition result and the second recognition result.

* * * * *